United States Patent [19]

Moor

[11] Patent Number: 4,751,901
[45] Date of Patent: Jun. 21, 1988

[54] COMPOSITE OIL FILTER

[76] Inventor: Stephen E. Moor, 816 Fay Ct., Point Pleasant, N.J. 08742

[21] Appl. No.: 107,809

[22] Filed: Oct. 13, 1987

[51] Int. Cl.⁴ ............................................. F01M 1/00
[52] U.S. Cl. ............................................... 123/196 A
[58] Field of Search ............... 123/196 A; 252/10, 11; 427/421, 391, 389.9, 335; 210/168

[56] References Cited

U.S. PATENT DOCUMENTS

| | | | |
|---|---|---|---|
| 2,262,526 | 11/1941 | Fairlie et al. | 123/196 A |
| 2,310,305 | 2/1943 | Miller et al. | 123/196 A |
| 3,958,061 | 5/1976 | Singer et al. | 427/421 |
| 4,098,944 | 7/1978 | Pollock | 427/421 |
| 4,144,166 | 3/1979 | De Jovine | 252/10 |
| 4,232,087 | 11/1980 | Trask | 427/421 |

*Primary Examiner*—E. Rollins Cross
*Attorney, Agent, or Firm*—Charles F. Gunderson

[57] ABSTRACT

A filter for the engine oil systems of internal combustion engines, fits into a standard oil filter cartridge or receptacle. The filter cartidge may be of any conventional type, but should be of the best quality, and able to remove as much as possible of the particulate contaminents to provide the best possible mechanical filtering function. The body of this filter cartridge is impregnated with specific chemicals of the type normally added to the lubricating oils by the manufacturer before distribution to counteract the inevitable oxidation, nitration and changes in acidity that degrade a lubricating oil in normal use. The chemicals must be impregnated into the filter in such a manner as to leach into the crankcase oil, over a period of time, in amounts that will compensate for losses in the system, and the amounts and types of chemicals can be structured for any given car, for a given mileage, and for given driving conditions. Timely changes of this filter can prolong the life of the lubricating oil, and the engine.

4 Claims, 1 Drawing Sheet

COMPOSITE OIL FILTER

BACKGROUND OF THE INVENTION

The U.S. Bureau of Standards states that oil does not wear out mechanically. However, motor oil loses its ability to effectively perform its task in an engine's environment due to two main contributing factors; degradation and contamination.

Degradation refers to the destructive chemical changes which occur in a lubricating oil when it is exposed to the operating environment of an internal combustion engine. The results are: oxidation, nitration, loss of additive effectiveness, and an adverse change in viscosity.

Contamination refers to outside substances that have entered into the oil that do not belong there. They are: fuel, soot, water, coolant, solid particles of dirt, and wear metals. Of these particulate contaminants, the microscopic particles in the 5 through 1 micron range have been borne out to cause 50% of the engine wear. They act as lapping agents that get into the regions of critical tolerances and grind the moving parts down.

In almost all operating environments, several of these unwanted substances can be found simultaneously. Their effects and combination of effects vary, but their presence does mean the inevitable inability of the oil to perform its multi-faceted tasks leading to almost-certain motor damage if left unchecked.

The particulate contaminants are meant to be removed by the oil filter. However, the degree of contaminent removal greatly depends upon the quality of the filter (its micron rating); how many filters are employed; and how they are employed in the system.

Due to critical design constraints, such as the filter being placed in direct series with the flow of oil, as in the case of full flow filters, the filter is only able to do a cursory job of filtration. Its' ability to hold large amounts of particulate contaminants is limited and the side of the contaminants being trapped is calculated so as not to plug the filter. The filter's ability to hold fuel, water, coolant, and soot that gets into the system is almost non-existent. Hence, the system, as it presently exists, taxes even the most sophisticated oils and their additive packages from the standpoint of contamination.

One of the objects of this invention, therefore, is to provide a mechanical contaminant filter that has the highest possible degree of filtration; capable of trapping the most minute particulates that could cause abrasive damage to the engine.

In the case of degradation, the oils additive package, that is invariably included in all detergent motor oils—plays a major role in the critical job of keeping in check the forces of oxidation, nitration, and viscosity breakdown. The additive package is also responsible for holding in suspension some of the outside contaminants that have entered the system that the oil filter is unable to trap and hold. This is done by the various constituents of the additive package that are able to surround and hold these unwanted by-products and contaminants in suspension and shield the moving parts of the motor from their damaging effects until the oil filter can be changed, and the oil drained and replaced with new detergent notor oils.

This additive constituent is found in various diluted strengths of approximately 4 to 6% by volume in almost every detergent motor oil. A typical, almost-universal, motor oil additive pachage would contain approximately 50% of an ashless dispersant; 15% of alkyl zink dithiophosphate; and 35% of metalic detergents, by volume.

It should be noted, here, that there are innumerable additives to oils, available at all automotive supply stores, that guaranty almost as many cures to oils and engines, but these are essentially supplements for the improvement of the viscosity of the oil that is lost due to chemical dilution of the oils, However, there are no additives, available on the retail market, that are actually intended for, or able to compensate for, the chemical changes in the oil, or for the reconstituting of the oil for that purpose.

It is therefore, another, and the primary, object of this invention to provide a filter that can systematically introduce the specific chemicals to the oil that can restore, as much as possible, the depleted additive-package chemicals of the oil, so as to minimize the potential damage to the engine by the build-up of destructive chemicals and contaminants.

This filter would be treated with a chemical solution or additive package, that would include as much as possible, the specific chemicals of the very-same commercially-available packages, that were put into the base oils at the blenders. However, the amounts of the specific chemicals will be chosen to compensate for those of the original additive package, to the extent that they will have been exhausted by natural depletion during engine use.

This solution can be applied to any and all types of oil filtration media, and is compatible with all oil filters, whether primary or full flow, axial or radial flow, spin-on or cartridge types, and in the case of heavy duty engines, such as diesels, to any and all configurations of secondary or bypass filters. The application of this solution should be done at the factory by the oil filters manufacturer to insure quality control and to insure that the strength of the solution added to each filter would be commensurate with a specific vehicles oil sump capacity, and its projected use. Degradation of the oil would, of course, be a function of the type of engine and its use.

This solution would leach out into the oil as the system called for its presence. Also the fact that the solution would be impregnated in the filters media would aid in the absorption of contaminants and improve the oil filter's ability to aid in the filtration process, because today's oil additives work as liquid filters in the oil.

It is a further object of this invention to provide a replaceable, disposable filter cartridge that will leach a measured portion of necessary additives into the lubricating system during the life of the cartirdge to reconstitute the chemical structure of the oil to continue compensating for the build up of acids, and other chemicals, in the lubricating system that would, eventually, damage the engine.

SUMMARY OF THE INVENTION

A filter cartridge for the oil systems of internal combustion engines, fits into a standard cartridge receptacle. While any standard filter may be modified and impregnated with he necessary chemicals to revitalize the crankcase oil, the filter cartridge chosen here is made up of rolled material that can remove contaminant materials of a fraction of a micron in size. The upper surface of the rolled filter provides an indication of what materials are being filtered out—soot, fuel, water, or metal—and when the filter should be replaced.

The rolled filter paper lends itself to being impregnated with chemicals in a controlled manner while it is being wound into a filter roll. These chemicals will leach into the crankcase oil over a long period of time to replace those chemicals of the additive package—that are included in all engine lubricating oils on the market today—to restore the neutralizing effect of the chemicals in the oil that will have deteriorated from use, and inhibit the corrosive elements in the oil.

Ultimately, these filters could so completely revitalize crankcase oil—since, again, oil does not wear out mechanically—that the oil should be useable almost indefinitely. This system could virtually preclude oil changes—or extend them by many thousands of miles. For the economy of the country, considering the numbers of cars in use today, the savings in lubricating oil would be not less than astronomical figures. For the ecology of the country, the reduction in the waste oils would be an enormous help.

DETAILED DESCRIPTION OF THE DRAWINGS

Figure 1:
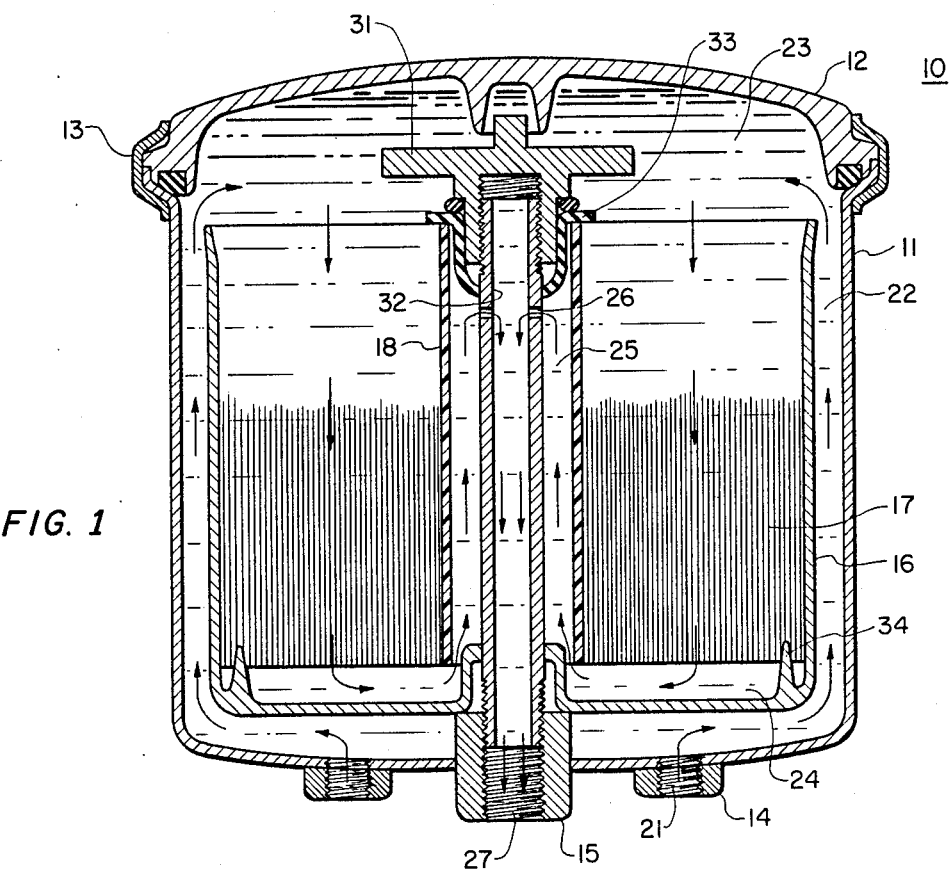
FIG. 1 shows a cross section of a typical oil filter.

Referring now more particularly to FIG. 1 a typical oil filter is shown in cross section. This filter most resembles those found in the standard "750" housing that is found in heavy duty equipment, such as trucks, but the concepts here are intended for all prefabricated filters.

In this case, a filter 10 has an outer casing 11, a lid or cap 12, and a connecting seal 13. An oil inlet is at 14, and an outlet is at 15. A replaceable filter cartridge has an outer casing 16, containing an inner filtering medium 17, that, in this case, is wound or wrapped around a tube 18.

In this filter, the oil enters through the inlet 14, at 21, passes around the cartidge casing 16, through the space 22 and up to a plenum 23. It is then drawn through the filter material 17, to the bottom of the cartridge at 24, from which it is drawn up through the inside 25 of the tube 18 and through the holes 26 in an output tube, and down through the outlet 15, at 27.

In this embodiment, the filter cartridge is held in place by a cap 31, that may be screwed down on the output tube 32, to force the upper part of the tube 18 against a gasket 33 to direct the filtered oil into the output tube. This also pushes a rim 34 into the outer edges of the filter material 17 to further keep the filtered oil from diverting around the filter.

This is, again, only a typical section of a typical filter. all filters must, of course, have an input, a filtering medium, and an output, and the actual mechanical filtering material is not limited to the wound filter element shown here, although this appears to be one of the most effective, and desirable mechanically, as well as being quite adaptable to the addition of chemicals, in controlled amounts, to the internal surfaces of the filtering media for controllable release into the lubricating system, to provide for the equally-important, and currently-neglected, potential, chemical function of an oil filter.

This chemical function, and the reduction of the chemical contaminants is accomplished by the addition of ingredients that will be proscribed to reconstitute the chemical balance of the oil before the chemicals break down—or are exhausted to a dangerous level. These ingredients must be added to the filter material, and may be added in any suitable manner, so that they can leach out into the oil, little by little, over a long period of time, to replace, as quantitatively as possible, the chemicals that are being lost, in engine use, through degradation and contamination.

Figure 2:
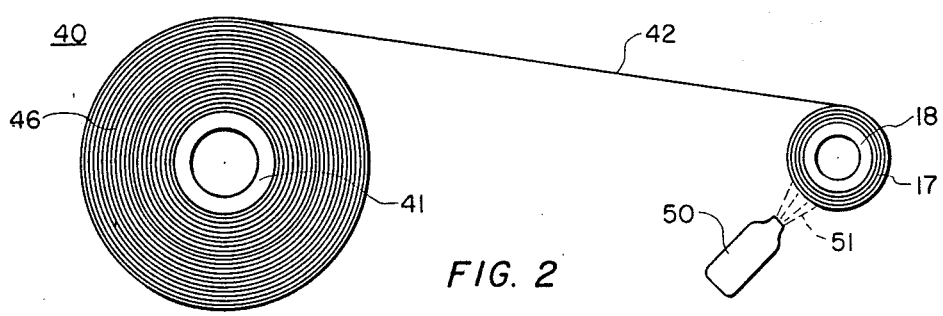
FIG. 2 shows one method for forming a filter.

A typical technique for adding the desired chemical ingredients to the typical filter is shown in FIG. 2. This shows a roll of filter material 17 being wound on the tube 18. The paper is supplied by a large roll 40 which consists of a drum 41 on which is pre-wound the paper 46, which is transferred along 42 to the filter cartridge roll 17.

As the filter roll is being wound, a source 50 of the prescribed chemicals under pressure can direct a fine spray 51 of the chemicals onto the filter paper as it is formed into the roll. This is essential, since the filter paper must be only lightly, but evenly, coated, or impregnated with the chemicals to provide a uniform leaching of the chemicals into the oil over a given time span.

A very significant way of extending the timing of the release of the essential chemicals, that is inherent in this system, is to vary the tension of the filter paper being wound on the spool, to vary closeness of the layers, and the resistance of that portion of the filter just enough to divert the flow of oil over various sections of the filter. The initial flow of oil would be through the more-loosely spaced portions, which would, gradually, clog up to divert the flow of oil, under more pressue, to the more tightly wound portions, and to new sources of unused chemicals, to extend the life of the filter.

This could be an automatic function, since the radius of the initial winding function is very much less than that of the final radius, and the tension, and the closeness of the layers being wound, must vary correspondingly.

Figure 3:
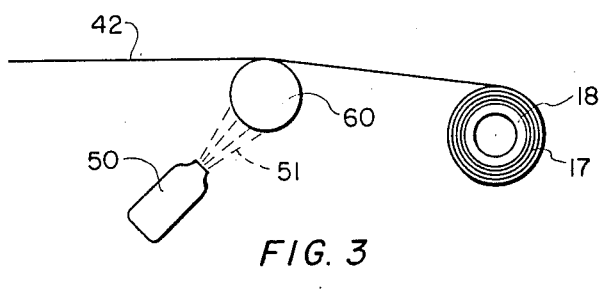
FIG. 3 shows another method for forming a filter.

FIG. 3 shows another way of applying the chemicals in a very-thin film to the paper as it is being coiled up on the filter cartridge roll. Here a roller 60 is pressed against the paper 42 on its way to be wound on the tube 18 to form the filter material 17.

Other ways of impregnating this, or other filter media will suggest themselves to those skilled in the art.

Actually, it should be possible to predict and provide concentrations of the replacement additive chemicals for certain types of cars, or trucks, for given mileages or times for a given additive filter. The season, the location, the type of driving, the type and manufacture of a car or truck, and even the age of the engine can all be considered in the selection of the contents—or strength—of the composite filter. Obviously, these factors can be taken into account in the recommendations of the time or mileage for the replacement of a filter.

What is claimed is:

1. An oil filter cartridge for an internal combustion engine comprises a container having an inlet connected to the oil circulating system of the engine to receive unfiltered engine oil under pressure from said engine, and an outlet connected back into said oil circulating system or said engine to discharge filtered and reconditioned engine oil back into said engine; said container having a filter material to remove contaminants from said engine oil circulating through said filter material; said filter material being impregnated with specific controlled amounts of certain of the essential additive chemicals that are initially supplied in engine oil by oil manufacturers, to replace a given proportion of those chemicals that are predictably lost in normal engine use over a given period of time, and under given conditions.

2. An oil filter, as in claim 1, wherein said filter material comprises an elongated sheet of filter material wound on a central shaft and positioned within said container.

3. An oil filter, as in claim 2, wherein said controlled amounts of certain of the essential chemicals are sprayed onto the surface of said elongated sheet of filter material to impregnate said filter material with said additive chemicals while it is being wound on said central shaft.

4. An oil filter, as in claim 2, wherein said elongated sheet of filter material is wound on said central shaft with varying tension so that there will be a variable spacing between the layers of said filter material, so that said oil passing through said filter material will first seek the looser windings and assimilate their chemicals until said looser windings gradually become blocked to force the oil through increasingly tighter windings to delay the application of said additive chemicals over a considerable length of time.

* * * * *